United States Patent [19]
Henry et al.

[11] Patent Number: 5,104,580
[45] Date of Patent: Apr. 14, 1992

[54] CONDUCTIVE COMPOSITE POLYMER FILM AND METHOD FOR ITS MANUFACTURE

[75] Inventors: Francois Henry, L'Hay les Roses; Dominique Broussoux, Marcoussis; Jean-Claude Dubois, Cressely-Magny les Hameaux, all of France

[73] Assignee: Thomson-CSF, Paris, France

[21] Appl. No.: 225,164

[22] Filed: Jul. 28, 1988

[30] Foreign Application Priority Data

Jul. 31, 1987 [FR] France ................... 87 10877

[51] Int. Cl.$^5$ ................................ H01B 1/00
[52] U.S. Cl. ................... 252/500; 252/519; 252/518; 252/512; 252/511
[58] Field of Search .......... 252/500, 518, 519; 204/59 R; 428/411.1, 500, 523, 692; 523/200, 201, 202, 206, 207, 218; 525/185, 186

[56] References Cited

U.S. PATENT DOCUMENTS

| | | | |
|---|---|---|---|
| 4,622,170 | 11/1986 | Wynne et al. | 252/519 |
| 4,705,645 | 11/1987 | Lee | 252/500 |
| 4,755,326 | 7/1988 | Laepins et al. | 252/500 |
| 4,769,115 | 9/1988 | Satoh et al. | 204/59 R |
| 5,034,463 | 7/1991 | Zijp et al. | 252/519 |

FOREIGN PATENT DOCUMENTS 0184367 11/1986 European Pat. Off. .

OTHER PUBLICATIONS

WPIL, File Supplier, resume No. 86 328 230, Derwent Publications Ltd, Londres, GB; & JP-A-61 243 198 (Hitachi Chemical) Oct. 29, 1986.

*Primary Examiner*—Josephine Barr
*Attorney, Agent, or Firm*—Oblon, Spivak, McClelland, Maier & Neustadt

[57] ABSTRACT

Disclosed is an electrically conductive composite polymer film formed from an organic matrix and conductive charges. The matrix is a polymer obtained from a filmogenic macromolecular latex and the conductive charges consist of a conductive polymer diffused in the matrix. The invention can be applied to microwave absorbent layers.

10 Claims, No Drawings

CONDUCTIVE COMPOSITE POLYMER FILM AND METHOD FOR ITS MANUFACTURE

BACKGROUND OF THE INVENTION

1. Field of the Invention

The present invention concerns a new type of electrically conductive polymer film as well as a method for manufacturing it.

2. Description of the Prior Art

Conductive organic layers can be applied in many fields: electrostatic shielding, computer connections based on organic materials, shielding for S.H.F. applications, shielding for infrared applications etc. The techniques used to obtain these layers are common to the applications referred to, except for use in computer connections, where the layer must be pyrolyzed in order to obtain the required levels of conductivity.

The simplest technique used to obtain these layers consists in mixing a conductive powder (metal, carbon or electroactive polymer) in a macromolecular binder of the vinyl type (such as polyisoprene, polyvinyl chloride, etc.) or of the epoxy or polyurethane type. The electrical and dielectrical properties of the layers thus obtained depend not only on the properties of the matrix but also on the type of particles constituting the powder, their form (spherical or elongated) and the specific surface area of all the powder. However, regardless of the mixing protocol used to obtain conductive charged films, the material is only relatively homogeneous. This is because of the presence of microvacuums related to the existence of aggregates of conductive charges. This causes the material to be excessively charged beyond the percolation threshold and, hence, causes a reduction in the mechanical and filmogenic properties of films of this type. Furthermore, this method cannot used to manufacture a film with dielectrical and electrical properties which differ along the thickness and which would enable impedance matching.

According to another technique, conductive polymers are synthesized by electrolytic deposition through an expanded binder of reactive solvent covering one of the electrodes. This method gives interpenetrated films, but the random diffusion process cannot be supervised through the matrix (of polyvinyl alcohol or polyvinyl chloride) and does not enable these films to be homogeneous and highly charged.

In order to remove these drawbacks, the invention proposes a composite conductive polymer film consisting of a latex-based macromolecular matrix which is monodispersed in size, through which the electroplating of a conductive polymer is caused.

SUMMARY OF THE INVENTION

An object of the invention therefore, is an electrically conductive polymer film made up of an organic matrix and conductive charges, wherein the matrix is a polymer obtained from a filmogenic macromolecular latex and wherein the conductive charges consist of a conductive polymer diffused in the matrix.

Another object of the invention is a method for the manufacture of a composite polymer film as defined above, wherein the matrix is first deposited on a conductive support used as an electrode in an electrochemical cell, the conductive charges being then diffused in the matrix by the electropolymerization of a conductive monomer.

DESCRIPTION OF THE PREFERRED EMBODIMENTS

The term latex designates a stable dispersal of a polymer in an aqueous medium. Because the coalescence phase of macromolecular latexes is relatively slow, the material during maturing has a porosity which is substantially greater than that of conventional films deposited through the evaporation of a solvent.

The invention uses this highly porous property of materials obtained from latex: this high porosity can be adjusted, according to the size of the particles used, to obtain a perfectly interpenetrated organic matrix of conductive polymer. Since the latex particles are deposited in a relatively even manner, the composite polymer films obtained will be remarkably homogeneous if one and the same plane of interpenetrated film is considered.

The method used to obtain a film according to the invention consists in depositing, firstly, a polymer film (or matrix) obtained from a latex on an electrode and then in interpenetrating this film by the electropolymerization of a conductive monomer in an electrochemical cell. The dissymmetry created by the electrical field between the electrodes of the electrochemical cell is used to obtain a film with an impedance which can be adjusted as and when the change takes place from the air/polymer interface to the polymer/electrode interface. According to the invention, it is possible to obtain a film that has no conduction at the air/polymer interface where the conductive charges are properly separated from one another as shown in microscopic observation and a conduction level which is almost semiconductive (or even metallic) at the polymer/electrode interface.

It is possible to obtain a non-homogeneous distribution of conductive charges in the thickness of the matrix by electroplating at constant voltage. There is thus a gradient of concentration in conductive polymer according to thickness. To increase the concentration in conductive charges and prevent screen effect, it is possible to perform electroplating with increasing voltage during the process for diffusing conductive charges in the matrix.

The porosity of a polymer film obtained from a latex will go on diminishing as and when the particles of the coalesced latex get increasingly interpenetrated. This step in the maturing of the film partly depends on the nature of the latex, the surface charges and, above all, its glass transition temperature with respect to its filmification temperature. The size of the pores can be determined from the size of the latex particles. This therefore makes it easy to reach the conductve polymer percolation threshold. A consequence of this high porosity is that relatively thick films can be interpenetrated while preserving excellent mechanical strength in the films formed.

The thickness of the film and the intrinsic conductivity are essential for the use of these films as shielding layers against S.H.F., U.H.F. and dwarf (infrared) waves. The value of a conductive polymer film with variable impedance according to the invention is that it can be used to gradually adjust the impedance of the medium along the path on which the wave is propagated, from the impedance of the air to the impedance of the film support which is generally close to zero. Having an air/polymer interface with matched impedance enables the cancelling of the reflection of the incident wave. The electromagnetic wave that penetrates the film according to the invention will be, to a great extent, be dissipated in the form of heat inside the film.

The formation of a homogeneous polymer film based on aqueous suspensions of macromolecular latex comprises three main stages, each of which will influence the physical, chemical and, above all, mechanical qualities of the film.

The first step is that of the isothermal evaporation of water. This step is governed to a great extent by physical parameters, such as temperature, pressure, aeration of the surface, etc. These magnitudes are generally independent of the material. In fact, during this step, the particles of latex are unrelated to each other and, therefore, their interaction is weak.

The second step is that or coalescence or the step where the latex particles are placed in irreversible contact with a view to maximum densification. This step and the following one are partly governed by the internal characteristics of the dispersal such as the size of the particles and their dispersal, the shearing force of the particle which depends above all on the glass transition temperature of the polymer, the nature and quantity of the surface charges capable of creating a double layer which, by its rigidity, prevents the particles from coalescing.

The coalescence is continued by the maturing step. The apparently homogeneous polymer film is again constituted by juxtaposing latex beads which are deformed and interpenetrated in varying degrees in a face-centered face cube or compact hexagonal lattice. Under the microscope, the film has a characteristic diamond or honeycomb structure. This interdiffusion step is generally slow and greatly depends on the filmification temperature as compared with the glass transition temperature of the latex as well as on the polarity of the surface groups. The mechanical and transport properties (permeability, electrical resistance etc.) are then major parameters accounting for the quality of the film formed. A very high permeability to vapor is observed at this level. This permeability diminishes with maturing time. By increasing the monodispersed size of the latex particles, the size of the pores, in which the growth of the conductive polymer takes place, will be increased. A compromise can be found in which the latex particles are sufficiently interpenetrated (giving good mechanical resistance) and where the pores are of a sufficient size to initiate and properly promote the electropolymerization process.

For aqueous suspensions of latex, the interpenetration reaction of the particles can be stopped by lyophilization of residual water.

As an example, we shall describe the preparation of a few films according to the invention. Starting from a filmogenic macromolecular latex, for example of the butyl styrene-acrylate type, to obtain a polymer matrix. This matrix can be obtained by polymerization in aqueous emulsion in the presence of either potassium persulphate, to have particles charged with sulphate or sulphonate groups, or azocarboxylic acid to have carboxyl type surface charges.

Depending on the styrene-acrylate ratio, the glass transition temperature of the polymer obtained can be adjusted. Initially, the aqueous suspension of latex is concentrated with a rotavapor. Then it is deposited evenly on a conductive support, for example, by the so-called spinner method. As a conductive support, it is advantageous to use an ITO glass (oxide mixed with tin and indium) which will give the matrix a strictly smooth surface. To slow down and monitor the process of interpenetration of the latex particles, the water is evaporated at a temperature below that of the glass transition. Thus, phenomena of cracking on the film are avoided.

The conductive support lined with the polymer matrix obtained is then plunged into an electrochemical cell where the conductive polymer will be electropolymerized. The conductive support is then used as an anode. The cell may also comprise a calomel cathode and a counter electrode consisting of a platinum wire. The cell is filled with a solvent such as acetonitrile in which the monomer to be electrodesposited is dissolved. An electropolymerizing dopant, such as tetraethylammonium tetrafluoroborate $(C_2H_5)_4 N^+BF_4^-$ is also introduced in the solvent.

The electropolymerization is thus performed in relatively standard conditions, using a prior art bipotentiostat. Depending on the porosity and thickness of the matrix and, especially on its electrical impedance, the voltage of the cell often has to be increased as compared with what it would be if electropolymerization had to be performed only on the uncoated ITO electrode of the matrix. The homogeneity of the electrical field lines between the calomel cathode and the deposition anode is essential to obtain a wide surface of latex, interpenetrated with conductive polymer, which is as homogeneous as possible.

Generally, the matrix expands in the solvent. The interpenetration is thus doubly effective, firstly because of this expansion and, secondly, because of the high natural porosity of the matrix. Thus the films, which are easily detachable from the ITO support, show very great homogeneity and high density in interpenetrated, conductive polymer.

By bringing the temperature and voltage at the electrodes into play, an interpenetrated polymer film can be obtained which is totally dielectrical on the surface in contact with the solvent of the cell and has conductibility of the metallic type on the surface in contact with the anode.

Table 1, placed at the end of the description, gives the conductivity values obtained by four-stylus recording of measurements on both sides of several deposits. The films marked I to III are films according to the invention while the film IV is a film according to the prior art. The films I and II have a matrix which is a film obtained from a latex of the butyl styrene-acrylate type (50% by weight of styrene to 50% by weight of acrylate). The matrix of the film III is a film obtained from a butyl acrylate latex alone. The particles are monodispersed and the size of the latex particles can be adjusted between 200 and 600 nm. The monomer to be electropolymerized is bithiophene in the case of the films I and H and bithiophene $\beta$-substituted by a dodecyl association, $(CH_2)_{11} CH_3$ in the case of the film II. Their weight in the film obtained will be about 15%. For the films I to III, the electroplating voltage has been given. The film IV has been obtained by mixing an ethoxyline based resin, known under the brand name of Araldite, and bithiophene at a rate of more than 20% of bithiophene in the total volume of the mixture.

Table 1 clearly shows that the films according to the invention (films I to III) have conductivity levels which are appreciably different from one side to the other. On the contrary, the prior art film (film IV) has surface conductivity levels which practically do not vary from one side to the other.

The conductive charges which can be used are substituted or unsubstituted heterocyclical monomers. Apart from bithiophene, we might cite substituted or unsubstituted pyrrole and substituted or unsubstituted thiophene.

Another method for depositing conductive polymer film is the following one. The electroplating of the macromolecular can be done beforehand on the parts to be coated under the same voltage conditions as those used for the formation of anode paints. The conductive polymer and its dopant are then introduced into the reactive mixture, and the monomer is electropolymerized through the previously deposited matrix.

The metal anode may have the appropriate shape to coat any metallic part or other of the object to be shielded with an absorbent layer. For instance, the part to be shielded may be a projection of a wing or of a cabin or of the metallic structure of a radome.

The latexes themselves may be magnetic so as to obtain a magnetic layer with magnetic properties. The magnetic dipoles of the latexes may be oriented beforehand, i.e. before the coalescence phase.

In table 2, placed at the end of the description, certain dielectrical characteristics of a film according to the invention (film V) at 9 GHz have been compared with other prior art films (films VI to XI) and with a film XII, the matrix of which is not obtained from a latex but for which bithiophene has been diffused by electropolymerization.

The film V has a matrix which is a film obtained from a butyl styrene-acrylate type of latex (50% by weight of styrene to 50% by weight of acrylate) and the electropolymerized monomer is bithiophene (which represents 15% of the weight of the film obtained). The films VI to XI have been obtained by mixing. The film VI is a mixture of polycarbonate (bisphenol A polycarbonate) and bithiophene (about 20% by weight). The film VII is a mixture of polyvinyl alcohol (PVA) and bithiophene (abut 20% by weight). The film VIII is a mixture of Araldite and bithiophene. The films IX, X and XI are mixtures of polyvinyl chloride with 16%, 30% and 41% of bithiophene, respectively, with respect to the total volume. The film XII has a matrix which is a film of poly n-hexyl methacrylate deposited on a conductive support (ITO glass) and obtained by evaporation of a solvent. By electropolymerization, bithiophene was diffused in the matrix obtained.

Table 2 gives the values of the permittivities (real parts $\epsilon'$ and imaginary parts $\epsilon''$) of the films and their mean conductivities $<\sigma>$ as a function of their thickness. The permittivity values were determined at 9 GHz by measuring disturbances of the resonant cavity used in transmission. The mean conductivity is deduced from the measurements of $\epsilon''$ at 9 GHz. From this table, it is seen that the mean conductivity is always greater for the film V (the interpenetrated latex-based film) than for the other polybithiophene charged films. The conductivity especially remains greater than that of the film XII which is obtained by the evaporation of a solvent and is also interpenetrated with bithiophene based conductive polymer. It is because of the low porosity of the matrix of this film that the conductivity is so low despite its very small thickness ($6\mu$) which promoted the diffusion of bithiophene.

To make it possible to obtain mean conductivity values approaching that of the film V, the films X and XI were highly charged with bithiophene (30% and 41% respectively of the volume of the film) thus making these films very brittle.

The microwave absorbent properties of the films can be appreciably improved by inserting magnetic charges into the core of the latex particles, in addition to the electrical charges which are evenly positioned. This gives films with magnetic and dielectrical properties.

TABLE I

| Film | Thickness | Electroplating voltage | $\sigma$ Air/polymer ($\Omega^{-1} \times cm^{-1}$) | $\sigma$ Polymer/anode ($\Omega^{-1} \times cm^{-1}$) |
|---|---|---|---|---|
| I | $20\mu$ | 4 V | $2 \times 10^{-3}$ | 0.405 |
|   | $45\mu$ | 4 V | $1.47 \times 10^{-4}$ | 0.1 |
| II | $250\mu$ | 4 V | $\simeq 10^{-5}$ | $5 \times 10^{-3}$ |
| III | $225\mu$ | 4 V | $3.31 \times 10^{-5}$ | $7 \times 10^{-3}$ |
| IV | $135\mu$ |  | $8.7 \times 10^{-6}$ | $7.8 \times 10^{-6}$ |

TABLE II

| Film | Thickness | $\epsilon'$ | $\epsilon''$ | $<\sigma>$ ($\Omega^{-1} \times cm^{-1}$) |
|---|---|---|---|---|
| V | $40\mu$ | 7 | 10 | $6.3 \times 10^{-2}$ |
| VI | $60\mu$ | 3.4 | 1.1 | $5.7 \times 10^{-3}$ |
| VII | $380\mu$ | 3.3 | 1.2 | $6.2 \times 10^{-3}$ |
| VIII | $125\mu$ | 1.1 | 0.17 | $8.9 \times 10^{-3}$ |
| IX | $170\mu$ | 4.76 | 1.6 | $8.4 \times 10^{-3}$ |
| X | $150\mu$ | 4.82 | 2.21 | $1.16 \times 10^{-2}$ |
| XI | $150\mu$ | 3.03 | 2.3 | $1.2 \times 10^{-2}$ |
| XII | $6\mu$ | 2.5 | 0.047 | $2.5 \times 10^{-4}$ |

What is claimed is:

1. An electrically conductive composite polymer film comprising an organic matrix and conductive charges, wherein the matrix is a porous polymer obtained from a filmogenic macromolecular latex, wherein said latex is a stable dispersion of said matrix polymer in an aqueous medium, and wherein the conductive charges consist of an electrically conductive effective amount of a conductive polymer, said conductive polymer comprising heterocyclical monomer units, wherein said diffused conductive polymer is electrically conductive, diffused evenly in the matrix with respect to a plane parallel to the surface of the film.

2. A composite polymer film according to claim 1 wherein the latex is a butyl stryrene-acrylate latex.

3. A composite polymer film according to claim 1 wherein the latex is a butyl acrylate latex.

4. A composite polymer film according to claim 1 wherein the latex is magnetic, and wherein said magnetic latex comprises magnetic charges inserted into the core of the macromolecular latex particles.

5. A composite polymer film according to claim 1 wherein said monomor is thiophene, bithiophene or pyrrole, substituted or unsubstituted.

6. A composite polymer film according to claim 5 wherein said monomer is bithiophene $\beta$-substituted by a $(CH_2)_{11} CH_3$ group.

7. A composite polymer film according to claim 1, wherein the impedance of said polymer film varies along the thickness of said polymer film.

8. A composite polymer film according to claim 1, comprising a concentration gradient in said conductive polymer along the thickness of said polymer film.

9. A composite polymer film according to claim 7, wherein the electrical conduction at one surface of said film is substantially zero and wherein the electrical conduction at the other surface of said film is substantially semiconductive or metallic.

10. A composite polymer film according to claim 1, wherein said latex comprises monodispersed latex particles.

* * * * *